UNITED STATES PATENT OFFICE.

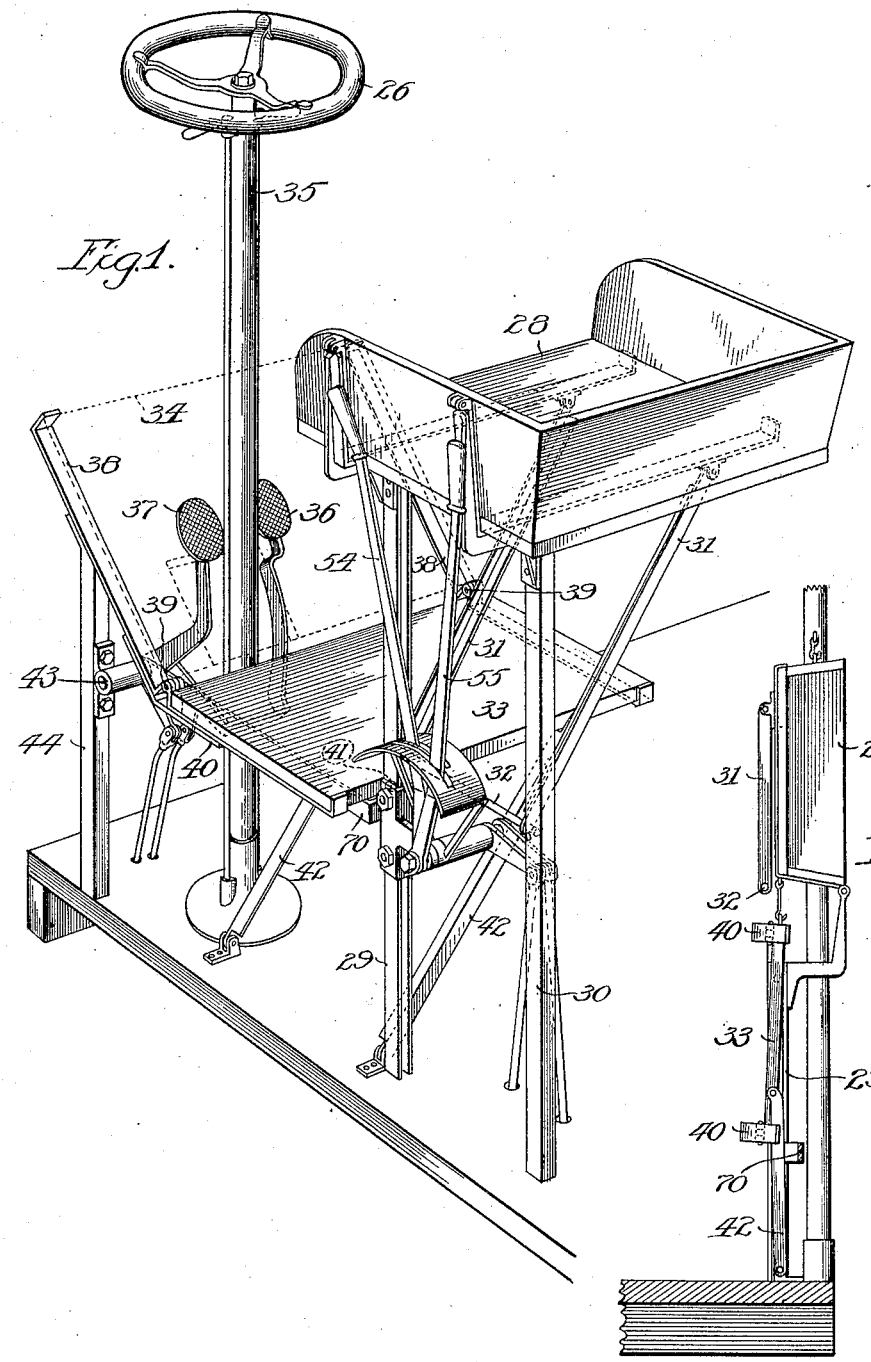

HERBERT L. PARRISH, OF BENTON HARBOR, MICHIGAN.

AUTOMOBILE-TRUCK.

1,005,065.    Specification of Letters Patent.    Patented Oct. 3, 1911.

Application filed March 9, 1908. Serial No. 419,966.

*To all whom it may concern:*

Be it known that I, HERBERT L. PARRISH, citizen of the United States, residing at Benton Harbor, in the county of Berrien and State of Michigan, have invented a certain new and useful Improvement in Automobile-Trucks, of which the following is a full, clear, concise, and exact description.

My invention relates to a seat for an automobile truck. Its object is to provide a tilting or folding seat (and preferably also a folding foot-rest associated therewith), so that the driver may sit at either end of the vehicle to control it, leaving the seat at the other end tilted out of the way.

I will describe my invention in detail by reference to the accompanying drawings, in which Figure 1 is a perspective view of one of the duplicate equipments of steering and controlling apparatus, with the folding seat and foot-rest associated therewith; and Fig. 2 is a detail front-end view of the seat and foot-rest, tilted or folded so as to lie edgewise at the side of the truck body.

The same reference characters indicate the same parts wherever they are shown.

The steering mechanism may be operated by a hand wheel 26 mounted upon a steering post 35. Immediately behind each steering post is a seat 28 which is mounted in such a way as to tilt or fold edgewise at the side of the truck when not in use. In the vehicle shown each seat is pivoted at its upper outside edge to upright supports or standards 29, 30, which are mounted near the side edge of the truck body. These supports are preferably provided with brackets at their upper ends, upon which the seat may rest; and the seat may further be supported by legs 31, 31, hinged at their upper ends to the under side of the seat-bottom, the lower ends of said legs being pivoted to a cross brace 32 which is arranged to slide vertically in the upright standards 29 and 30. The standard 29 is a steel bar, H-shaped in cross section; and the standard 30 is a steel channel-bar. The channels in these standards form slide-ways in which the cross-brace 32 may slide. A folding foot-rest is also preferably provided. In the vehicle shown, this foot-rest comprises a horizontal floor portion 33, and a sloping portion 34. The steering-post 35, with the usual spark-control and throttle-control lever shafts mounted alongside thereof, rises through the sloping portion 34 of the foot-rest, and two pedal levers are also shown rising through said sloping portion 34. One of these pedals 36 may control the clutch, and the other pedal 37 may control the brake. An interlocking arrangement for the pedals may be provided, whereby the brake pedal when depressed carries the clutch pedal down with it to throw off the clutch when the brake is applied. This presupposes the usual arrangement in which during the running of the vehicle the clutch is thrown on by allowing the clutch pedal to rise.

The pedals 36 and 37 are shown to be pivoted upon a bracket 43 which is mounted upon an upright brace 44, which assists in supporting the foot-rest.

In order to permit the foot-rest to fold up, the sloping portion 34 (which is slotted to allow for the pedals and steering post) may be removable from the side supports 38, 38, which are hinged at 39, 39, to the forward edge of the floor portion 33. Said hinged supports 38 have rearward extensions 40 which come against the under side of the floor portion 33, to brace said supports when the latter are in their open or extended position. A brace 70 normally supports one side or end of the floor 33, while the extended end is supported by legs or links 42, 42, which are pivoted to the under side thereof and also pivoted to the floor of the truck. The floor portion 33 of the foot-rest also carries a lug 41 which is adapted to slide in the front channel of the H-shaped seat-supporting upright 29.

In folding the foot-rest, the sloping floor portion 34 is first removed from the hinged supports 38, and said supports are then folded toward the rear, the floor portion 33 being also lifted up so that its lug 41 slides up in the channel of upright 29, the legs 42 swinging upwardly upon their pivoted lower ends, until the whole structure lies edgewise along the side of the truck, as shown in Fig. 2.

The removable portion 34 of the foot-rest may be used in the foot-rest frame at either end of the vehicle as desired. The hand steering wheel may also be adapted for removable attachment to either steering post, so that while the set of controlling apparatus at one end of the truck is in use the set at the other end is thus partially dismantled, and the remaining parts thereof are so folded or tilted to one side that they take up the minimum amount of space.

In the vehicle shown, the controlling apparatus at each end of the truck includes the hand levers 54 and 55 which are pivoted at the side of the seat upon the upright 29. At one end of the vehicle the lever 54 is the "forward" lever and lever 55 is for "reversing"; while at the opposite end of the vehicle the lever 55 is the "forward" lever and lever 54 the "reverse" lever. The levers are preferably so positioned normally that the one used as a "forward" lever is more conveniently placed under the hand of the operator. When one set of hand levers 54 and 55 is in use at one end of the vehicle, the corresponding set at the other end may be thrown out of service by disconnecting their links from the bell-crank levers which they operate. The links will then hang loosely from said hand levers, so that the operation of the set which is in service will not affect the idle set.

I claim:

1. In an automobile truck, the combination with a floor body, of a seat and foot rest, and supports therefor rising from said floor body at the lateral edge thereof, said supports being adapted to permit said seat and foot-rest to be tilted independently into edgewise positions at the side of the truck, when not in use.

2. An automobile truck having a floor body, vertical supports rising from said floor body in a row along the side thereof, a seat and foot-rest mounted upon said vertical supports so as to swing vertically into edgewise positions when not in use.

In witness whereof I hereunto subscribe my name this 12th day of February, A. D., 1908.

HERBERT L. PARRISH.

Witnesses:
   D. C. TANNER,
   A. H. MOORE.

---

Copies of this patent may be obtained for five cents each, by addressing the "Commissioner of Patents, Washington, D. C."